US012577063B1

(12) United States Patent　　　　(10) Patent No.:　US 12,577,063 B1

Forlini et al.　　　　　　　　　　(45) Date of Patent:　Mar. 17, 2026

(54) APPARATUS AND METHOD FOR GRIPPING, LIFTING AND INVERTING FOAM SHEET

(71) Applicant: FXI, Inc., Radnor, PA (US)

(72) Inventors: Michael Forlini, Gilberts, IL (US); Matt Reese, Lockport, IL (US); Elkadir Lemus, West Chicago, IL (US); Frank Pessetti, Aurora, IL (US)

(73) Assignee: FXI, Inc., Radnor, PA (US)

( * ) Notice: Subject to any disclaimer, the term of this patent is extended or adjusted under 35 U.S.C. 154(b) by 431 days.

(21) Appl. No.: 18/315,559

(22) Filed: May 11, 2023

(51) Int. Cl.
　　*B65G 47/252*　　(2006.01)
　　*B65G 47/90*　　(2006.01)
　　*B65H 15/00*　　(2006.01)
　　*A41H 43/02*　　(2006.01)

(52) U.S. Cl.
　　CPC ......... *B65G 47/252* (2013.01); *B65G 47/901* (2013.01); *B65H 15/00* (2013.01); *A41H 43/0264* (2013.01); *B65G 2201/022* (2013.01); *B65H 2301/33214* (2013.01)

(58) Field of Classification Search
　　CPC .. B65G 47/248; B65G 47/252; B65G 47/901; B65G 2201/022; B65H 15/00; B65H 15/008; B65H 2301/33214; B65H 2301/33216; A41H 43/0264
　　See application file for complete search history.

(56) References Cited

U.S. PATENT DOCUMENTS

| | | | |
|---|---|---|---|
| 3,275,122 A | | 9/1966 | Carlson |
| 3,554,354 A | * | 1/1971 | Reid ................... A41H 43/0264 |
| | | | 198/395 |
| 3,967,723 A | | 7/1976 | Beckham |
| 4,968,021 A | | 11/1990 | Wafford |
| 4,982,835 A | * | 1/1991 | Butler ................ B65G 21/2072 |
| | | | 198/860.3 |
| 5,040,778 A | * | 8/1991 | Cole, Jr. ................ B65H 15/00 |
| | | | 198/380 |
| 5,845,759 A | * | 12/1998 | Takada ................ A41H 43/0264 |
| | | | 198/395 |

(Continued)

FOREIGN PATENT DOCUMENTS

| | | |
|---|---|---|
| CN | 106115236 A | 11/2016 |
| KR | 101703706 B1 | 2/2017 |

*Primary Examiner* — Gene O Crawford
*Assistant Examiner* — Keith R Campbell
(74) *Attorney, Agent, or Firm* — Rogowski Law LLC

(57)　　　　ABSTRACT

An apparatus and method for inverting a flexible foam sheet being conveyed on a moving conveyer grips the leading edge of the foam sheet with a clamp and raises the clamp above the moving conveyor surface. As the leading edge is held by the clamp, the foam sheet progressively separates from the moving conveyor surface and is curled back over itself until the trailing edge of the foam sheet passes beyond the clamp and the foam sheet is inverted. Upon releasing the clamp, the inverted foam sheet is deposited onto the moving conveyor, now with the former leading edge comprising the trailing edge. In an embodiment, the foam sheet comprises two profiled layers nested together, and the clamp lifts the leading edge of the top profiled layer to separate and invert such top layer from the bottom layer, depositing the inverted top layer onto the conveyor behind the bottom layer.

27 Claims, 11 Drawing Sheets

(56)          References Cited

U.S. PATENT DOCUMENTS

| | | | |
|---|---|---|---|
| 6,533,267 B1 * | 3/2003 | Muessig | A41H 43/0278 |
| | | | 112/306 |
| 9,085,125 B2 * | 7/2015 | Gesquiere | B32B 3/30 |
| 9,938,079 B1 * | 4/2018 | Vogel | B65G 47/5127 |

* cited by examiner

APPARATUS AND METHOD FOR GRIPPING, LIFTING AND INVERTING FOAM SHEET

FIELD OF THE INVENTION

The present invention is generally directed to apparatus and methods for fabricating compressible cellular polymer materials (e.g., foam). In particular, the apparatus and methods invert compressible foam sheets being conveyed on a moving conveyor.

BACKGROUND OF THE INVENTION

Compressible cellular materials such as flexible polyurethane foams are formed by reacting a polyol with an isocyanate in the presence of a blowing agent. The liquid materials are mixed together and poured into a mold or onto a moving conveyor, and allowed to rise and cure in the shape of a foam bun or block. The foam bun or block is then cut into desired size lengths and then slit to form sheets, which sheets in turn may be sliced or profiled by profile cutters or convoluters or by surface modification technology (SMT). With profile cutters or convoluters, the shaped/profiled foam sheets generally emerge as two cut sheets with the shaped/profiled/cut surfaces nested together.

Bedding mattresses, cushions and furniture often incorporate multiple layers of compressible foam sheets, such as polyurethane foams and memory foams. To achieve desired support characteristics, one or more surfaces of the foam sheets may be cut or profiled, including but not limited to, convolute cut or surface modified, to create peaks and valleys or ridges and troughs or combinations thereof on the sheet surfaces.

When fabricating mattresses, cushions and furniture, the foam sheets, whether or not profiled, may be conveyed on moving conveyors as part of the product assembly. If the sheets are cut or profiled, fabricators must separate the cut or profiled surfaces and reorient the sheets with cut surfaces facing a same direction (such as upward) before the sheets are advanced to a next fabrication area or staging area on the moving conveyor. It is particularly challenging to reorient foam sheets with lengths and widths substantially greater than their thicknesses in an automated manner due to characteristics of flexible foams, such as compressibility of the foam as well as frictional engagement between the foam and the moving surface of the conveyor.

Accordingly, improvements for apparatus and methods for handling flexible, compressible foam sheets, and particularly for processing surface-profiled flexible, compressible foam sheets, continue to be sought.

BRIEF SUMMARY OF THE INVENTION

According to one embodiment of the invention, an apparatus for inverting a foam sheet has a clamp configured for gripping and lifting a leading edge of the foam sheet that is being conveyed on a moving surface of a conveyor. The clamp is supported by a clamp carriage, which may be mounted on a frame to maintain position of the clamp above the conveyor. The clamp carriage is configured for lowering the clamp to a first height above the moving surface of the conveyor and for raising the clamp to a second height above the moving surface of the conveyor. With the leading edge lifted a predetermined distance above the moving surface of the conveyor, the foam sheet progressively separates from the moving surface of the conveyor and curls back over itself. Due to frictional engagement between the foam and the moving surface of the conveyor, the entire length of the foam sheet does not separate from the moving surface of the conveyor immediately. Rather, only the portion that is lifted by the clamp separates and then, as the remaining portion of the foam sheet continues to be conveyed past the clamp, the foam sheet curls and inverts until the trailing edge has past the clamp. The clamp then releases what was formerly the leading edge of the foam sheet, and the inverted foam sheet is re-positioned on the moving surface of the conveyor. The formerly leading edge of the foam sheet is now the trailing edge of the foam sheet, and the first surface of the foam sheet that was previously in contact with the moving surface of the conveyor is now directed upwardly and the opposite surface is in contact with the moving surface of the conveyor.

The clamp carriage is supported by a frame, which frame is joined to the supporting structure of the conveyor with at least one mounting bracket, preferably at least two mounting brackets—each on an opposite side of the moving surface of the conveyor. At least one first pneumatic cylinder is directly or indirectly linked to the clamp and configured to open the clamp and to close the clamp. At least one second pneumatic cylinder is directly or indirectly linked to the clamp carriage and configured to raise and to lower the clamp carriage.

The moving surface of the conveyor travels under the frame to convey the foam sheet under the frame and to the clamp. The moving surface of the conveyor then conveys the foam sheet away from the frame and away from the clamp after the leading edge of the foam sheet has been released by the clamp and the foam sheet has been inverted.

Before inverting, the foam sheet has a first surface in contact with the moving surface of the conveyor and a second surface opposite the first surface. Before the inverting, the first surface of the foam sheet remains frictionally engaged with the moving surface of the conveyor as the foam sheet is conveyed to the clamp. As the clamp grips and lifts the leading edge of the foam sheet to the second height above the moving surface of the conveyor, a portion of the first surface of the foam sheet separates from the moving surface of the conveyor while a remaining portion of the foam sheet including the trailing edge remains frictionally engaged with the moving surface of the conveyor. The first surface of the foam sheet is progressively turned upwardly away from the moving surface of the conveyor as the leading edge of the foam sheet is held at the second height above the moving surface of the conveyor. The clamp is configured to release the leading edge of the foam sheet onto the moving surface of the conveyor after the trailing edge of the foam sheet has traveled under the frame. Upon release from the clamp, the foam sheet is inverted so that the second surface contacts the moving surface of the conveyor and the first surface is directed upwardly.

In one embodiment, at least the first surface of the foam sheet is profiled, and the surface opposite the first surface is substantially planar.

In another embodiment, the foam sheet is nested together with a second foam sheet, and the second foam sheet has a surface in contact with the moving surface of the conveyor. In this embodiment, the clamp is configured to grip and lift the leading edge of the foam sheet (the top foam sheet) and not to grip the second foam sheet (the bottom foam sheet) so that the first foam sheet with lifted leading edge separates from the second foam sheet as the second foam sheet continues to be transported by the moving surface of the conveyor. The clamp is configured to release the leading edge of the foam sheet (the formerly top foam sheet) so that the foam sheet is deposited onto the moving surface of the conveyor behind the second foam sheet (the formerly bottom foam sheet), and inverted so that the surface of the foam sheet that was nested with the second foam sheet is directed upwardly.

In still another embodiment, a second conveyor with a second moving surface is provided. The second conveyor is disposed at a height below the moving surface of the first conveyor. The second conveyor transports a second foam sheet. Movement of the second moving surface is coordinated with movement of the moving surface of the first conveyor (top conveyor). As the clamp grips and lifts the leading edge of the foam sheet to the second height above the moving surface of the conveyor (the top conveyor), a portion of the first surface of the foam sheet separates from the moving surface of the conveyor while a remaining portion of the foam sheet including the trailing edge remains frictionally engaged with the moving surface of the conveyor. The first surface of the foam sheet is progressively turned upwardly away from the moving surface of the conveyor (the top conveyor) as the leading edge of the foam sheet is held at the second height above the moving surface of the conveyor. The clamp is configured to release the leading edge of the foam sheet onto the moving surface of the conveyor (the top conveyor) after the trailing edge of the foam sheet has traveled under the frame, and after the second foam sheet has been conveyed by the second conveyor to a position beyond the clamp. Upon release from the clamp, the foam sheet is inverted so that the second surface contacts either the moving surface of the conveyor (the top conveyor) or the second moving surface of the second conveyor (the bottom conveyor), and the first surface of the foam sheet is directed upwardly. The inverted foam sheet is positioned so as to be conveyed in a same direction and behind the second foam sheet. The first surface of the inverted foam sheet may be profiled.

A method for inverting position of a foam sheet on a conveyor includes the steps of: conveying the foam sheet with the conveyor having a moving surface, said foam sheet having a first surface in contact with the moving surface, a second surface opposite the first surface, a leading edge and a trailing edge;

gripping the leading edge with a clamp;

lifting the clamp from a first height above the moving surface to a second height above the moving surface while allowing a remaining portion of the foam sheet to continue to be conveyed by the moving surface, so that the foam sheet progressively separates from the moving surface; and after the trailing edge has passed under the clamp and the leading edge held by the clamp, releasing the leading edge, wherein after the leading edge is released, the foam sheet is inverted so that the first surface is directed upwardly away from the moving surface of the conveyor and the second surface is in contact with the moving surface of the conveyor.

With the inventive method, the first surface of the foam sheet may be profiled, and the second surface of the foam sheet may be planar or substantially planar.

In an advantageous variation of the method, a second foam sheet may be conveyed on a second moving surface of a second conveyor, wherein the second conveyor is positioned below the first conveyor. The leading edge of the foam sheet held by the clamp may be released after the second foam sheet has been conveyed to a position downstream of the clamp and ahead of the foam sheet.

In another variation of the method, the foam sheet comprises a profiled foam sheet with a top layer and a bottom layer nested together at their profiled surfaces, wherein the bottom layer is in contact with the moving surface of the conveyor, and wherein the clamp grips the leading edge of the top layer, leaving the bottom layer to be conveyed by the moving surface of the conveyor and without being lifted by the clamp. The top layer progressively unnests from the bottom layer, and the top layer curls back and inverts to expose the profiled surface thereof. The clamp then releases the leading edge of the top layer after the bottom layer has been conveyed to a location away from the clamp.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings embodiments of apparatus and methods for gripping, lifting and inverting foam sheets which are presently preferred. It should be understood, however, that the disclosure is not limited to the precise arrangements and instrumentalities shown. In the drawings.

DESCRIPTION OF THE DISCLOSURE

Figure 1:
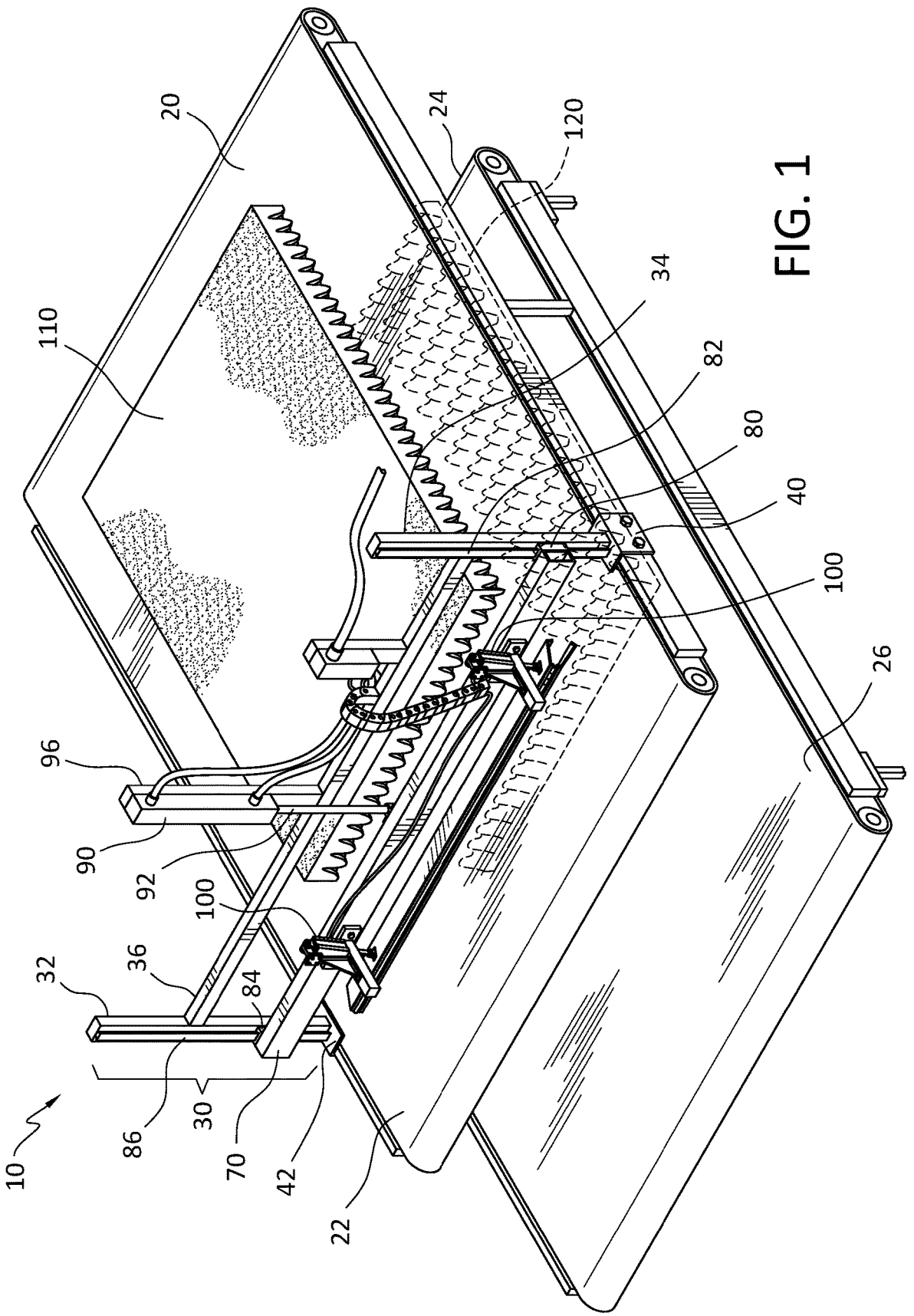
FIG. 1 is a right front side perspective view of a first embodiment of an apparatus for gripping, lifting and inverting a foam sheet according to the invention.
Figure 2:
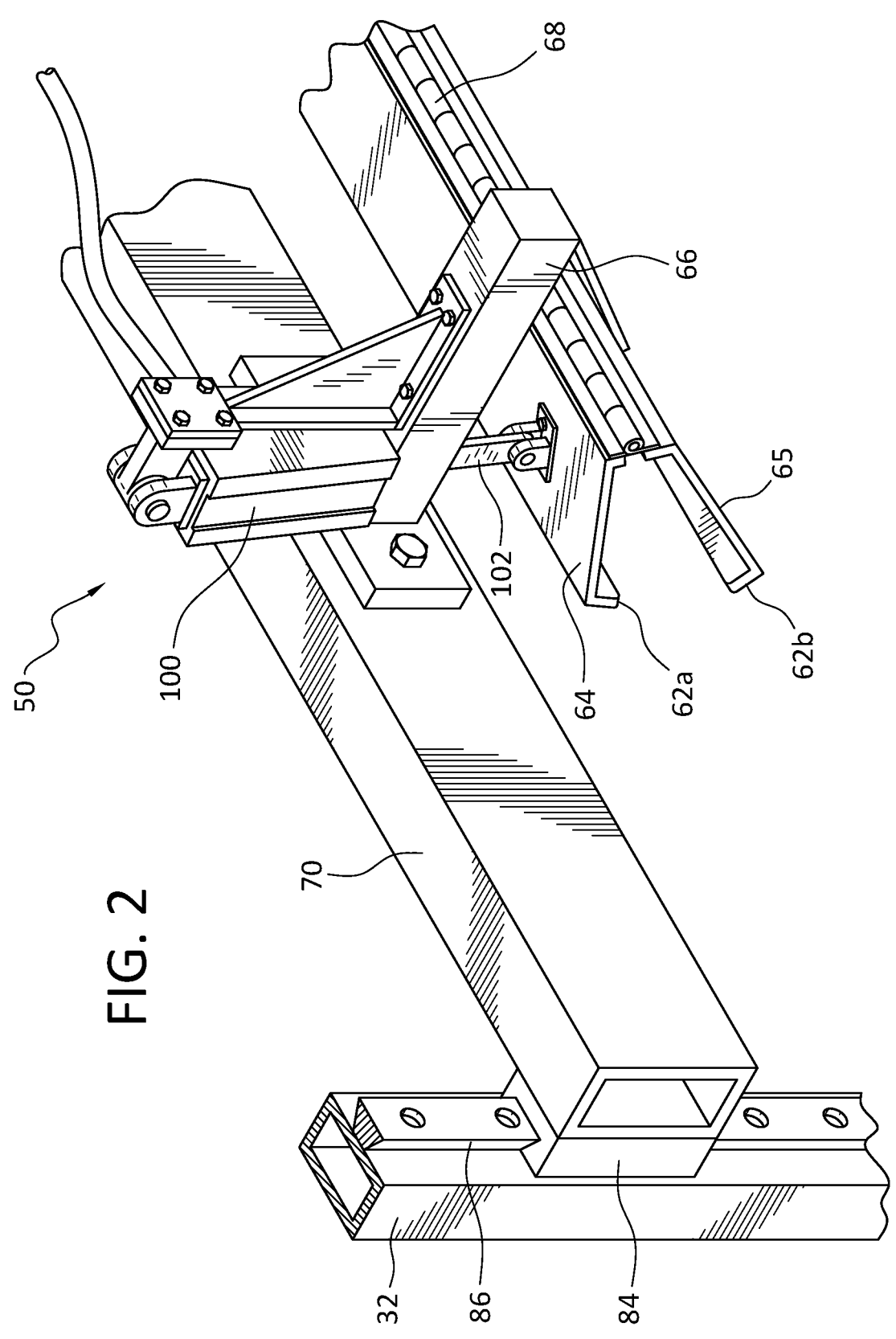
FIG. 2 is a left front perspective view of a clamp assembly of the apparatus of FIG. 1.
Figure 3:
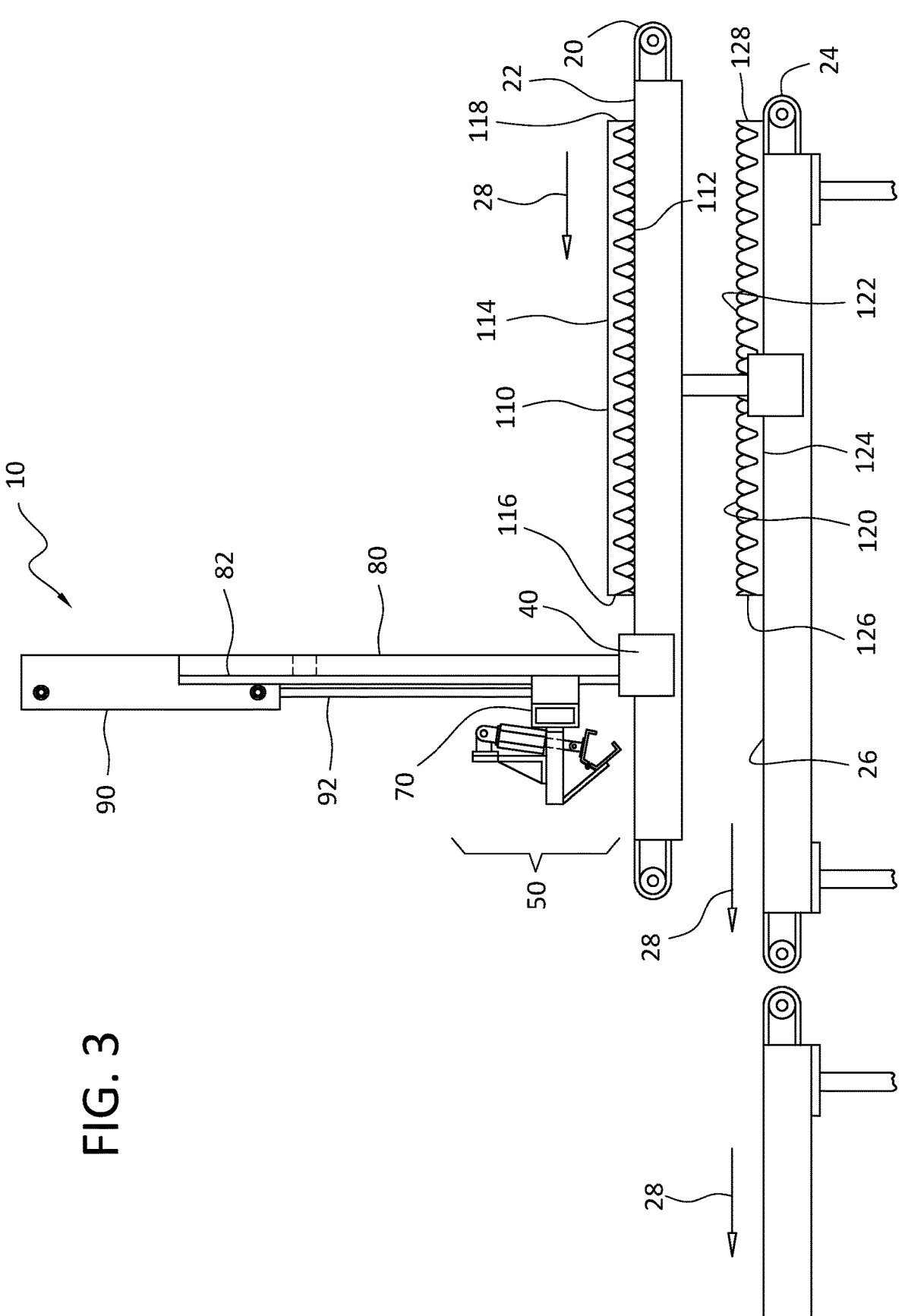
FIG. 3 is a right side elevational view of the apparatus of FIG. 1 with a surface-profiled foam sheet conveyed on a top conveyor of a split level conveyor assembly and a second surface-profiled foam sheet conveyed on a second or bottom conveyor located below the top conveyor of the split level conveyor assembly.
Figure 4:
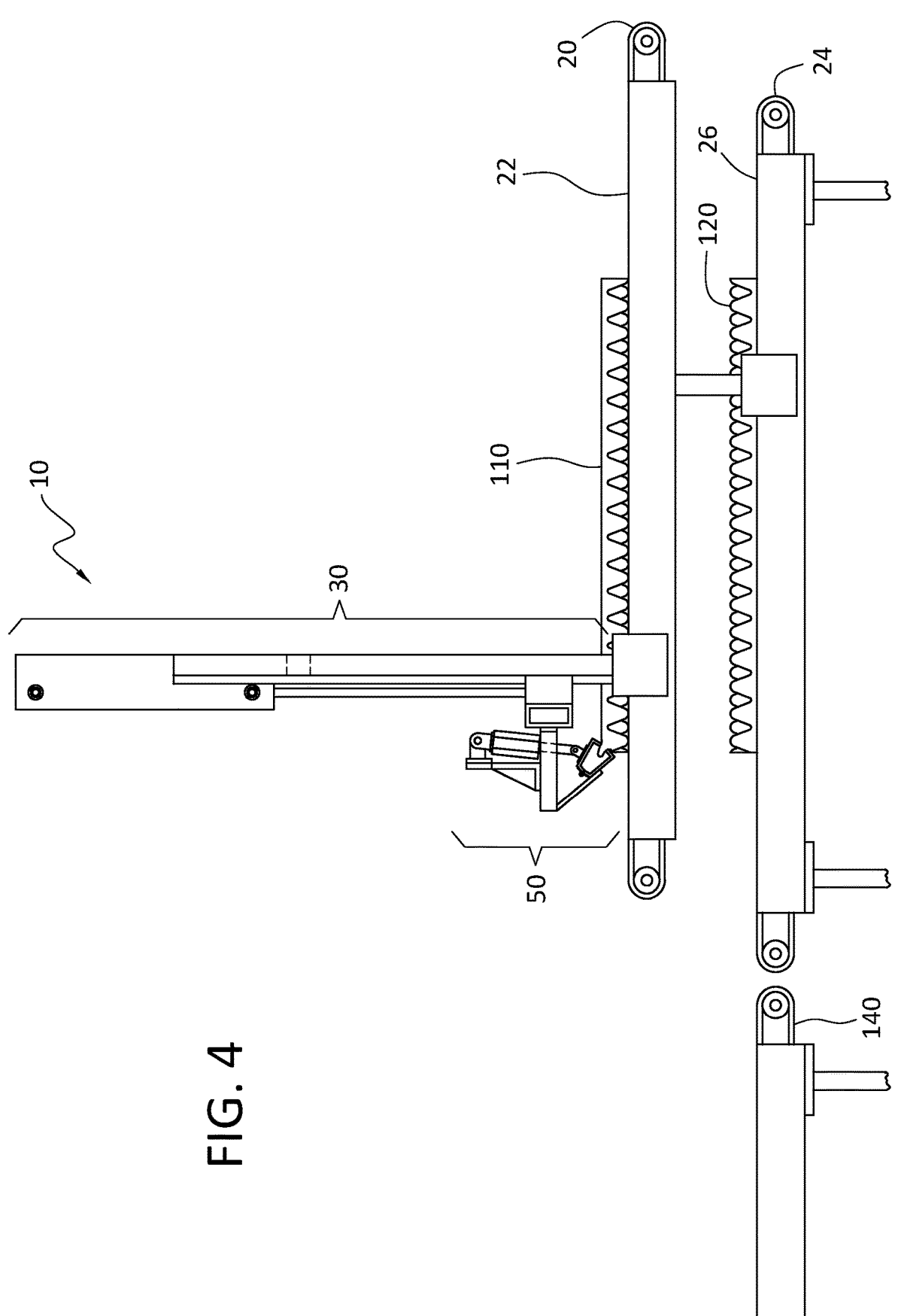
FIG. 4 is a right side elevational view of the apparatus of FIG. 1, in which the clamp assembly is engaging a leading edge of the surface profiled foam sheet on the top conveyor.

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

As used herein "sheet" generally refers to a rectangular piece, which rectangular piece may comprise a single layer or may comprise multiple stacked or nested layers. Notwithstanding the foregoing, a "sheet" is not limited to a rectangular configuration, and may have alternative geometries so long as such sheet has a leading edge that may be gripped by clamping jaws.

Referring to the drawings in detail, FIGS. 1-6 show a first embodiment of an apparatus 10 for gripping, lifting and inverting a sheet of flexible foam (compressible cellular polymer). A first conveyor 20 has a top surface 22 and a bottom surface opposite the top surface 22. A second conveyor 24 is positioned beneath the first conveyor 20 and has a top surface 26. The top surfaces 22, 26 are moving surfaces that move in the direction of arrows 28.

A frame 30 is mounted to the first conveyor 20 with a first mounting bracket 40 and a second mounting bracket 42 disposed on opposite sides of the moving surface or top surface 22 of the first conveyor 20. The frame 30 has a first vertical post 32 and a second vertical post 34 with a cross bar 36 connecting and stabilizing the vertical posts 32, 34. The cross bar 36 spans across the moving surface/top surface 22 of the first conveyor 20. The posts 32, 34 and cross bar 36 may be formed of steel tubing, such as square steel tubing.

A clamp assembly 50 is supported for movement to the frame 30. The clamp assembly 50 includes clamping jaws 60, a clamp carriage 70, a first pneumatic cylinder 90 and at least one second pneumatic cylinder 100. In the embodiment shown in FIGS. 1-6, there are two second pneumatic cylinders.

The clamping jaws 60 comprise an upper jaw 64 and a lower jaw 65, each shown in FIGS. 1-6 with bent jaw tips 62a, 62b, and a mounting bracket 66 to mount the clamping jaws 60 to the clamp carriage 70. The clamping jaws 60 may be formed of a metal channel bent to form the upper jaw 64, lower jaw 65 and a hinge 68 therebetween. Alternatively, the hinge may be a living hinge formed at the bend of the metal channel between upper jaw 64 and lower jaw 65. A suitable metal channel may be an aluminum U channel.

The clamp carriage 70 may be selectively raised or lowered to thereby raise or lower the height of the clamping jaws 60 with relation to the moving surface of the first conveyor 20. The clamp carriage 70 may be formed of a metal, such as aluminum tubing. The clamp carriage 70 is joined to a first carriage bearing 80 and a second carriage bearing 82. The first carriage bearing 80 is joined for movement along a first linear bearing rail 82 that is mounted one vertical post 32 of the frame 30 in a vertical orientation. The second carriage bearing 84 is joined for movement along a second linear bearing rail 86 that is mounted to the other vertical post 34 of the frame 30 in a vertical orientation. The clamp carriage 70 may be formed with a metal tubing, such as a rectangular aluminum tubing.

A first pneumatic cylinder 90 is provided to raise and lower the clamp carriage 70. The first pneumatic cylinder 90 has a push rod extension 92 that is joined to the clamp carriage 70. The push rod extension 92 acts on the clamp carriage 70 to force the clamp carriage 70 either downwardly or upwardly, so as to be closer to or farther from the moving surface 22 of the first conveyor 20. The first pneumatic cylinder 90 is joined to a support column 96 that extends from the cross bar 36 of the frame 30. An example of a suitable first pneumatic cylinder is manufactured by AZ PNEUMATICA—model 21.01587.4E/E11M20400400.

A pair of second pneumatic cylinders 100 are provided to open and close the clamping jaws 60. Each second pneumatic cylinder 100 has a push rod extension 102 that contacts or is joined to the upper jaw 64 of the clamping jaws 60. The push rod extension 102 acts on the upper jaw 64 of the clamping jaws 60 so as to urge the upper jaw 64 toward or away from the lower jaw 65. By such movement, the clamping jaws 60 may selectively grip and release a leading edge of a foam sheet 110 conveyed on the first conveyor 20. Each second pneumatic cylinder 100 is joined to the mounting bracket 66 of the clamping jaws 60. An example of a suitable second pneumatic cylinder is manufactured by INGERSOLL RAND—model ARO C/M50. Movement of the second pneumatic cylinders 100 is coordinated to open and close the clamping jaws 60.

As shown in FIGS. 3-6, a foam sheet 110 is conveyed on the moving surface 22 of the first conveyor 20, the first conveyor 20 being the upper conveyor. The foam sheet 110 has a profiled surface (or first surface) 112 and a substantially planar surface 114 opposite the first surface 112. The foam sheet 110 has a leading edge 116 heading toward the clamping jaws 60 and a trailing edge 118 at the rear portion of the foam sheet 110. The leading edge 116 is gripped by the clamping jaws 60 and lifted when the clamp carriage 70 lifts the clamping jaws 60 in a direction away from the moving surface 22 of the first conveyor 20. The clamping jaws 60 are lifted to a height above the moving surface 22 that is substantially less than the length of the foam sheet 110. As an example, for a foam sheet with a length of 80 inches between the leading edge and the trailing edge, and a thickness of from 1 to 3.5 inches, the lift height of the clamping jaws is from 15 to 50 inches.

Where the foam sheet 110 will be used in mattress construction, the foam sheet may have suitable dimensions for twin, full, queen, king, CalKing mattresses. For example, the sheet thickness may be from 1 to 3.5 inches, and the width and length dimensions may be Twin: 39 inch×75 inch, TXL 39 inch×80 inch, Full 54 inch×75 inch, Queen 60 inch×80 inch, King 76 inch×80 inch and California King 72 inch×84 inch.

A second foam sheet 120 is conveyed on the moving surface 26 of the second conveyor 24, the second conveyor 24 being below the first conveyor 20. The moving surface 26 of the second conveyor 24 is moved in the same conveying direction as the moving surface 22 of the first conveyor 20, and at a speed synchronized with the speed of the moving surface 22 of the first conveyor 20. The second foam sheet 120 has a profiled surface 122 and a substantially planar surface 124 opposite the profiled surface 122. The second foam sheet 120 has a leading edge 126 and a trailing edge 128. The second foam sheet 120 is conveyed below the first conveyor 20 of the split conveyor unit.

As the leading edge 116 of the first foam sheet 110 is gripped and lifted by the clamping jaws 60 (shown in FIGS. 4 and 5), the first foam sheet 110 progressively separates from the moving surface 22 of the first conveyor 20. Due to frictional engagement of the first surface 112 of the foam sheet 110 with the moving surface 22 of the first conveyor 20, the foam sheet 110 at its trailing edge 118 remains in contact with the moving surface 22 of the first conveyor 20 as the foam sheet passes under the frame 30 and under the clamping jaws 60. Due to the compressible nature of the flexible foam comprising the foam sheet 110, the foam sheet 110 curls back over itself as the trailing edge 118 continues to be conveyed by the moving surface 22. See FIG. 5. Once the trailing edge 118 has advanced a predetermined distance downstream from the frame 30 and clamping jaws 60, the second pneumatic cylinder 100 is released to cause the clamping jaws 60 to release what was the leading edge 116 of the foam sheet 110, thereby depositing the foam sheet 110 onto the moving surface 22 of the first conveyor 20, now inverted so that the profiled surface (first surface) 112 is directed upwardly and the substantially planar surface 114 is in contact with the moving surface 22 of the first conveyor 20. See FIG. 6.

Figure 5:
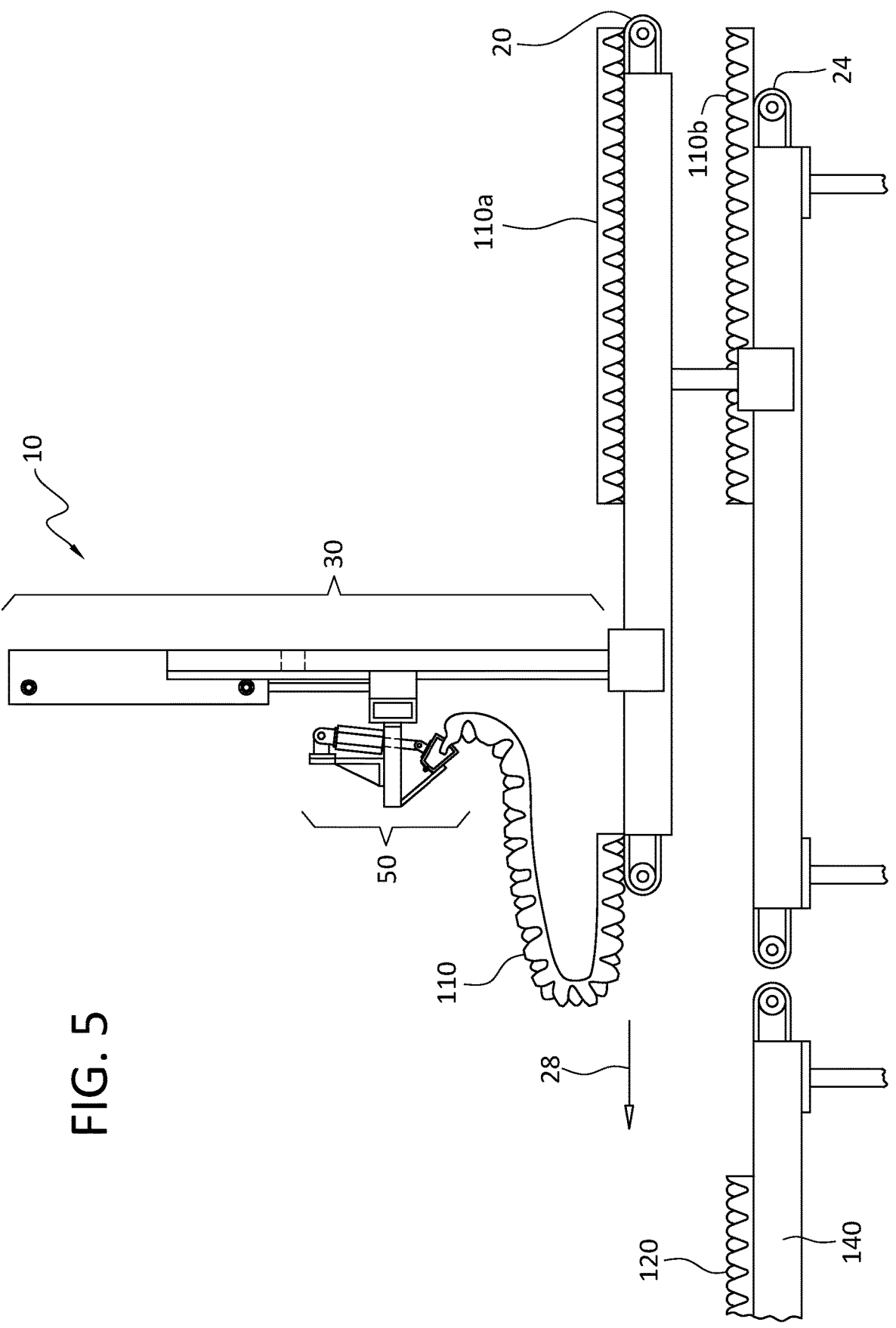
FIG. 5 is a right side elevational view of the apparatus of FIG. 1, in which the clamp assembly that has engaged the leading edge of the surface profiled foam sheet is raised by the clamp carriage, while the portion of the surface profiled foam sheet at or near the trailing edge continues to travel on the top conveyor to a position downstream from the clamp assembly.
Figure 6:
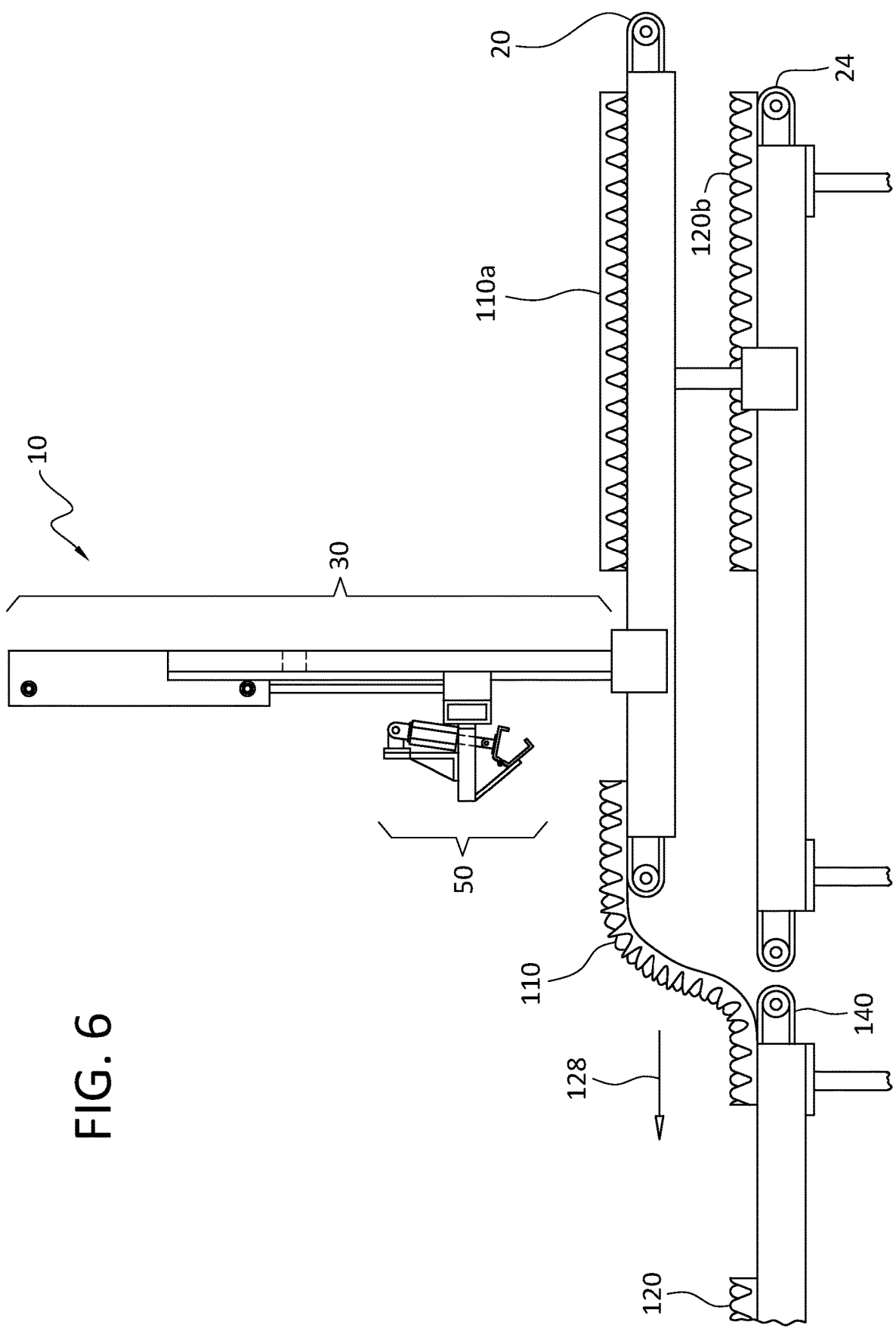
FIG. 6 is a right side elevational view of the apparatus of FIG. 1, in which the clamp assembly has released the leading edge of the surface profiled foam sheet, with the surface profiled foam sheet having been inverted and dropped on to the top conveyor, and then onto a third conveyor downstream of the top conveyor and the second conveyor so that the inverted surface profiled foam sheet is now conveyed behind the second surface-profiled foam sheet on an adjacent conveyor.

Referring to FIG. 5, because the speeds of the first conveyor 20 and second conveyor 24 are controlled, and preferably are synchronized, the second foam sheet 120 may be conveyed on the second conveyor 24 below the first conveyor 20 to advance the second foam sheet 120 to a downstream location ahead of the first foam sheet 110. In FIGS. 5 and 6, after the first foam sheet 110 is inverted, the first foam sheet 110 is deposited onto the moving surface 22 of the first conveyor 20, and then is dropped either onto the moving surface 26 of the second conveyor 24 in a position behind the second foam sheet 120. Alternatively, the inverted first foam sheet 110 may be deposited onto the moving surface of a third (downstream) conveyor 140. Both the first foam sheet 110 and the second foam sheet 120 have their profiled surfaces 112, 122 oriented facing upwardly. In the embodiment shown in FIG. 6, both sheets 110, 120 are then conveyed away from the second conveyor 24 by the third conveyor 140 to a desired next location for additional processing or fabrication. As shown in FIGS. 5 and 6, a next first foam sheet 110a and second foam sheet 110b are then conveyed by conveyors 20, 24 respectively, and the first foam sheet 110a may be gripped, lifted and inverted using the clamping assembly 50.

The compressible cellular polymer or foam forming the foam sheets may comprise flexible polyurethane foam, viscoelastic foam, or gel-infused polyurethane foam. The apparatus may grip, lift and invert sheets (or layers) of any conventional type and visco type foams suitable for incorporation into mattresses and furniture cushions.

FIGS. 7-11 show an alternative embodiment of an apparatus 210 for gripping, lifting and inverting a sheet of foam (compressible cellular polymer), or more specifically a top layer of a multiple layer sheet of foam. The apparatus 210 has a single first conveyor 220 with a moving surface (top surface) 222 of a desired width to convey a first foam sheet 310. The moving surface 222 moves in the direction of arrow 228.

A frame 230 is mounted to the first conveyor 220 with a first mounting bracket 240 and a second mounting bracket 242 disposed on opposite sides of the moving surface or top surface 222 of the first conveyor 220. The frame 230 has a first vertical post 232 and a second vertical post 234 with a cross bar 236 connecting and stabilizing the vertical posts 232, 234. The cross bar 236 spans across the moving surface/top surface 222 of the first conveyor 220.

A clamp assembly 250 is supported for movement to the frame 230. The clamp assembly 250 includes clamping jaws 260, a clamp carriage 270, a first pneumatic cylinder 290 and at least one second pneumatic cylinder 300. In the embodiment shown in FIG. 7, two second pneumatic cylinders 300 are provided.

Figure 7:
FIG. 7 is a front right side perspective view of a second embodiment of an apparatus for gripping, lifting and inverting a foam sheet according to the invention.
Figure 8:
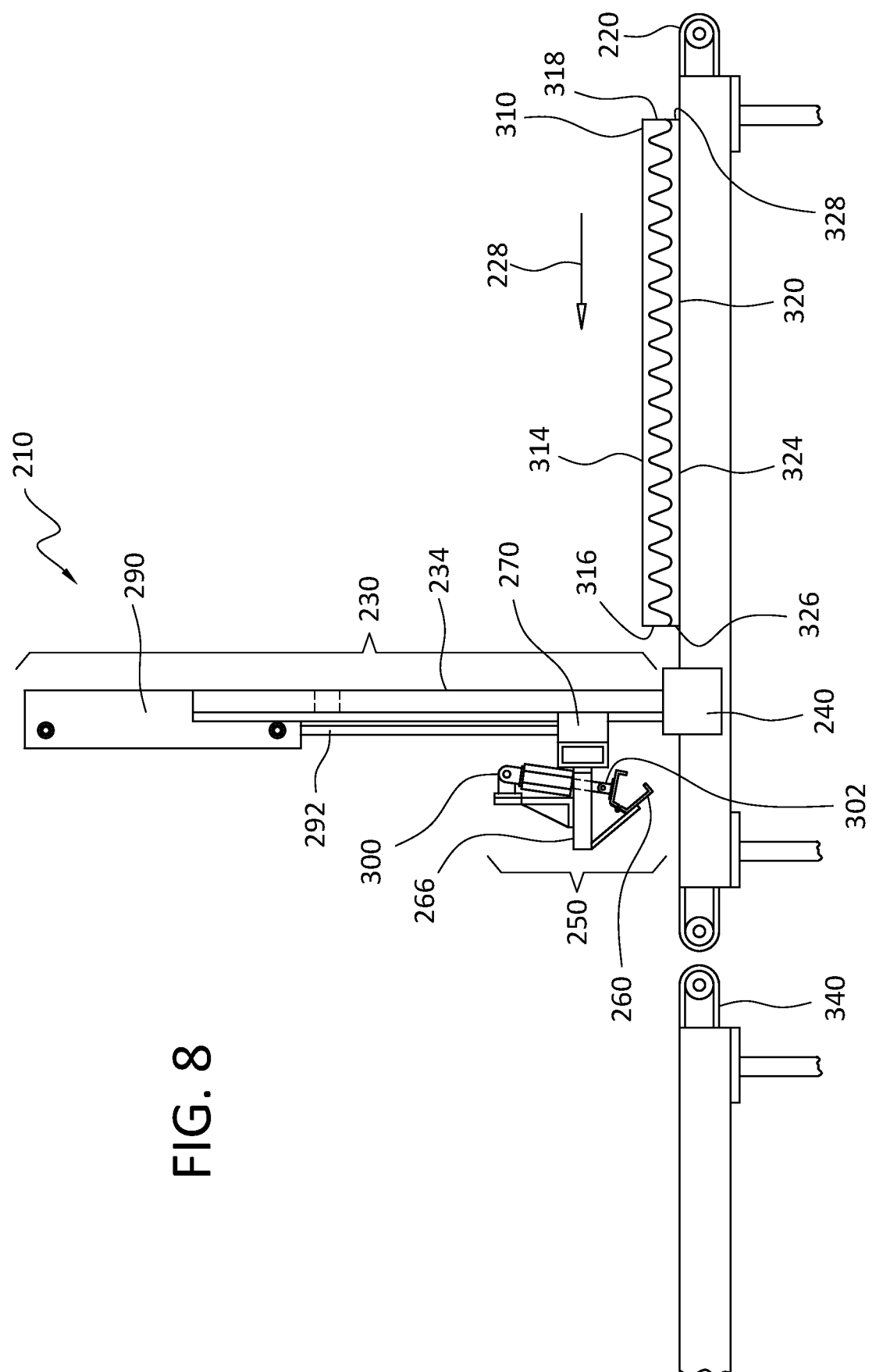
FIG. 8 is a right side elevational view of the apparatus of FIG. 7, showing a split foam sheet with two profiled layers nested together being conveyed toward a clamp assembly of the apparatus.
Figure 9:
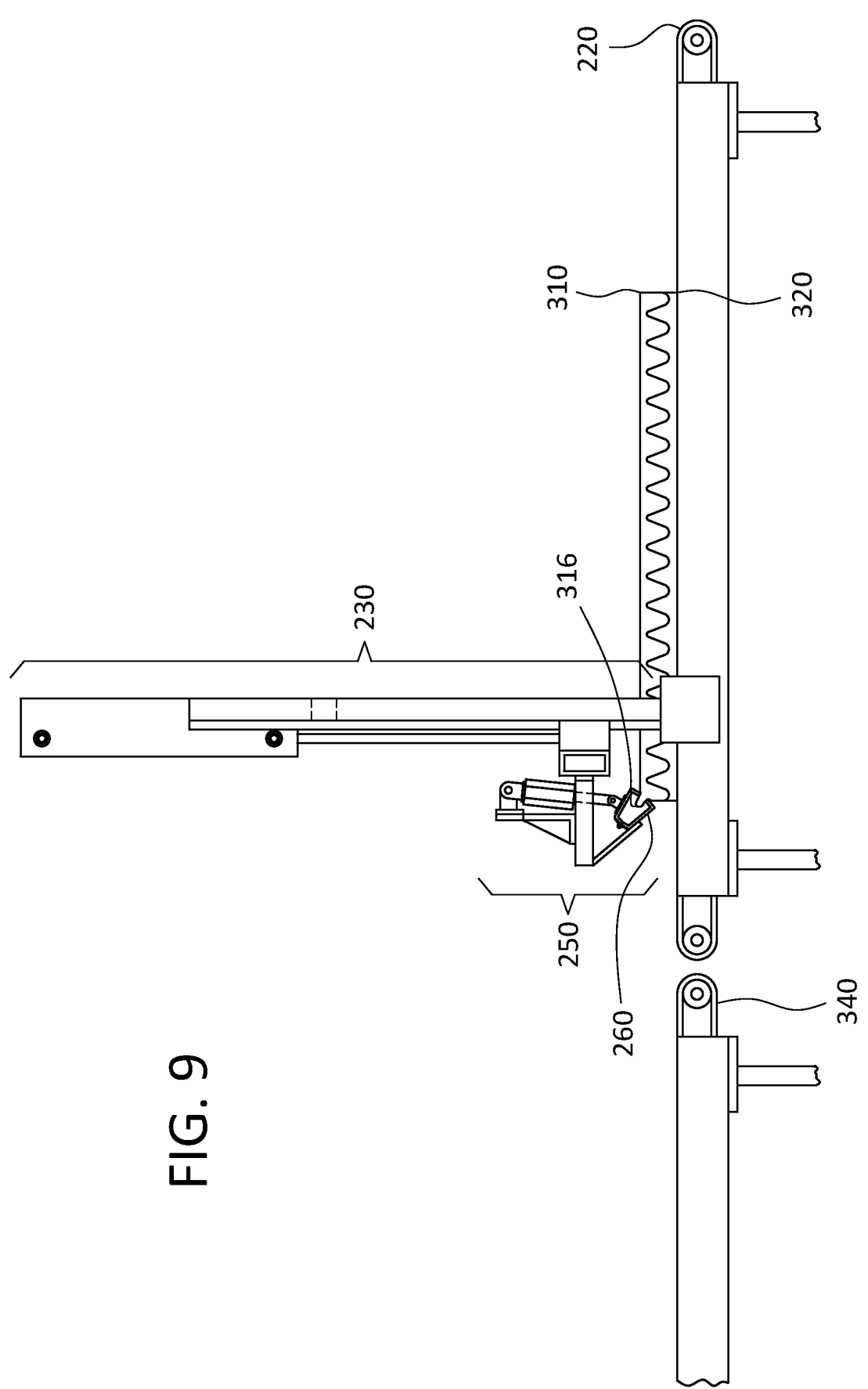
FIG. 9 is a right side elevational view of the apparatus of FIG. 7, with the leading edge of a top surface-profiled foam layer of the split foam sheet gripped by the clamp assembly.

The clamping jaws 260 comprise an upper jaw 264 and a lower jaw 265, each shown in FIGS. 6-8 with bent jaw tips 262, and a mounting bracket 266 to mount the clamping jaws 260 to the clamp carriage 270. The clamping jaws 260 may be formed of a metal channel bent to form the upper jaw 264, lower jaw 265 and a hinge 268 therebetween. Alternatively, the hinge may be a living hinge formed by bending the metal channel material. A suitable metal channel may be an aluminum U channel.

The clamp carriage 270 may be selectively raised or lowered to thereby raise or lower the height of the clamping jaws 260 with relation to the moving surface of the first conveyor 220. The clamp carriage 270 may be formed of a metal, such as aluminum tubing. The clamp carriage 270 is joined to a first carriage bearing 280 and a second carriage bearing 282. The first carriage bearing 280 is joined for movement along a first linear bearing rail 282 that is mounted one vertical post 232 of the frame 230 in a vertical orientation. The second carriage bearing 284 is joined for movement along a second linear bearing rail 286 that is mounted to the other vertical post 234 of the frame 230 in a vertical orientation.

A first pneumatic cylinder 290 is provided to raise and lower the clamp carriage 270. The first pneumatic cylinder 290 has a push rod extension 292 that is joined to the clamp carriage 270. The push rod extension 292 acts on the clamp carriage 270 to force the clamp carriage 270 either downwardly or upwardly, so as to be closer to or farther from the moving surface 222 of the first conveyor 220. The first pneumatic cylinder 290 is joined to a support column 296 that extends from the cross bar 236 of the frame 230.

In the embodiment shown (FIG. 7) two second pneumatic cylinders 300 are provided to open and close the clamping jaws 260. Each second pneumatic cylinder 300 has a push rod extension 302 that contacts or is joined to the upper jaw 264 of the clamping jaws 260. The push rod extension 302 acts on the upper jaw 264 of the clamping jaws 260 so as to urge the upper jaw 264 toward or away from the lower jaw 265. By such movement, the clamping jaws 260 may selectively grip and release a leading edge 316 a foam sheet 310 conveyed on the first conveyor 220. Each second pneumatic cylinder 300 is joined to the mounting bracket

266 of the clamping jaws 260. Movement of the push rod extensions 302 of the second pneumatic cylinders 300 is synchronized.

As shown in FIGS. 7-11, the foam sheet comprises two shaped, profiled or convoluted foam layers 310, 320 nested together at their shaped, cut or convoluted interface. The top or first foam layer 310 has a profiled surface 312 and a substantially planar surface 314 opposite the profiled surface 312. The first foam layer 310 has a leading edge 316 at its first end and a trailing edge 318 at its opposite end. The bottom or second foam layer 320 has a profiled surface 322 and a substantially planar surface 324 opposite the profiled surface 322. The second foam layer 320 has a leading edge 326 at its first end and a trailing edge 328 at its opposite end. Both foam layers 310, 320 are nested together at their profiled surfaces 312, 322, and the substantially planar surface 314 of the first foam layer 310 is directed upwardly, and the substantially planar surface 324 of the second foam layer 320 is in contact with the moving surface 222 of the first conveyor 220.

The clamping jaws 260 of the clamp assembly 250 grip and lift the leading edge 316 of the first foam layer 310 as the clamp carriage 270 is moved upwardly by action of the first pneumatic cylinder 290. Upon lifting the leading edge 316, the second foam layer 320 continues to be conveyed under the frame 230 and under the clamping jaws 260. The first foam layer 310 progressively is peeled apart from the second foam layer 320, and the first foam layer 310 curls back over the second foam layer 320 as the second foam layer 320 continues to be conveyed downstream. The frictional engagement between the second foam layer 320 and the moving surface 222 of the first conveyor 220 keeps the second foam layer 320 in contact with the moving surface 222 so that the second foam layer 320 continues to be conveyed downstream past the clamp assembly 250. The flexible and compressible foam material allows the first foam layer 310 to bend or curl back as it is peeled away from the second foam layer 320, while the trailing edge 318 remains in contact with the second foam layer 320 until the trailing edges 318, 328 pass under the clamping jaws 260 and frame 230.

Figure 10:
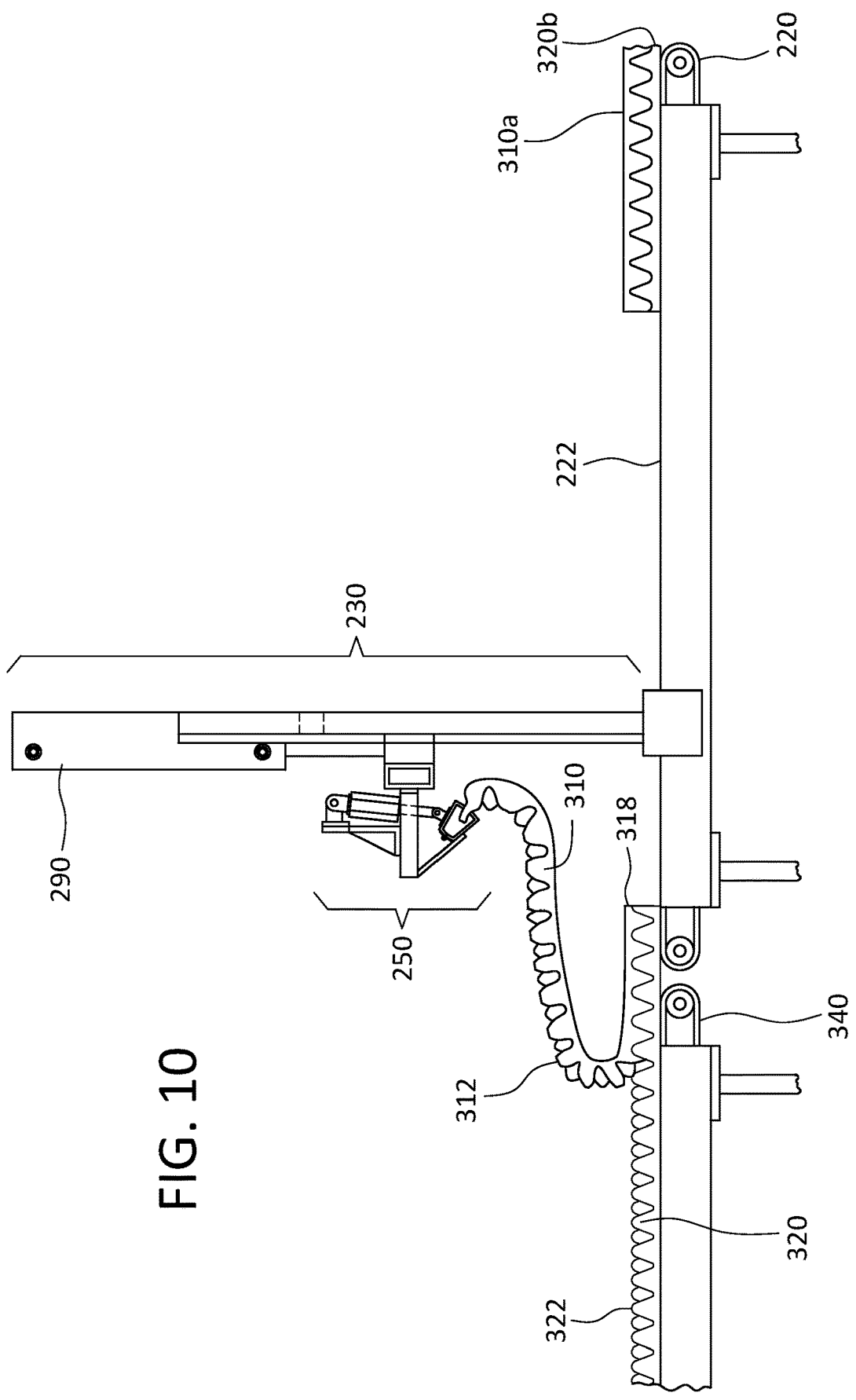
FIG. 10 is a right side elevational view of the apparatus of FIG. 7, with the leading edge of the top surface-profiled foam layer being gripped and lifted by the clamp assembly to separate the top surface-profiled foam layer from a bottom surface-profiled foam layer of the split foam sheet and by continued conveyance allowing the top surface-profiled foam layer to be inverted so that the surface-profiled side will be oriented face up on the conveyor upon release from the claim of the apparatus.
Figure 11:
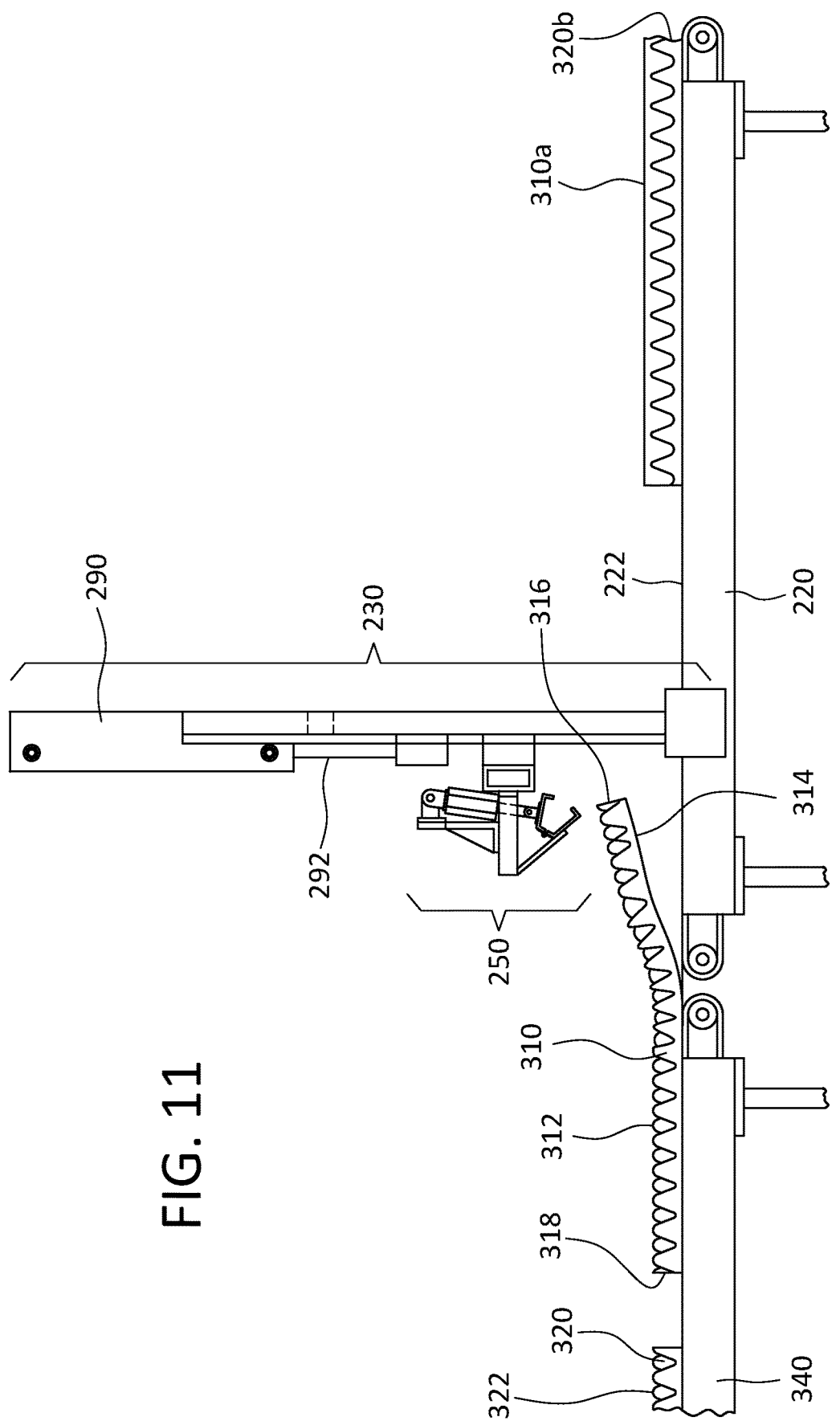
FIG. 11 is a right side elevational view of the apparatus of FIG. 7 after the leading edge of top surface-profiled foam layer is released from the clamp assembly and top surface-profiled foam layer is deposited back onto the conveyor behind the bottom surface-profiled foam layer, and showing that the top surface-profiled foam layer has been inverted such that the formerly leading edge now is the trailing edge after being released and the cut foam surface is directed upwardly from the conveyor.

Once the first foam layer 310 is separated from the second foam layer 320, and the second foam layer 320 has advanced downstream on the moving conveyor 220 a desired distance from the clamping assembly 250 and the frame 230, the clamping jaws 260 are opened to release what had been the leading edge 316 of the first foam layer 310. Upon such release, the first layer sheet 310 is deposited onto the moving surface 222 of the conveyor 220 in a position behind the trailing edge 328 of the second foam layer 320. As so deposited, the first foam layer 310 is inverted, with the profiled surface 312 now directed upwardly away from the conveyor 220, and with what formerly was the trailing edge 318 now the leading edge of the first foam layer 310. As shown in FIGS. 10 and 11, the second foam layer 320 now leads the first foam layer 310, and both are transferred to an additional conveyor 340 downstream from the conveyor 220. As shown in FIGS. 10 and 11, a next foam sheet with a first foam layer 310*a* and a second foam layer 320*b* is then ready to be conveyed by the conveyor 220 toward the frame 230 and clamping assembly 250.

Additional objectives, advantages, features and application possibilities of the present invention ensue from the description of embodiments making reference to the drawings. In this context, all of the described and/or depicted features, either on their own or in any meaningful combination, constitute the subject matter of the present invention, also irrespective of their compilation in the claims or the claims to which they refer back.

The invention claimed is:

1. An apparatus for inverting a foam sheet, comprising:
a clamp configured for gripping and lifting a leading edge of the foam sheet, wherein the foam sheet has a trailing edge, and wherein the foam sheet is nested together with a second foam sheet and the clamp is configured not to grip the second foam sheet;
a conveyor with a moving surface for conveying the foam sheet and the second foam sheet, wherein the second foam sheet has a surface in contact with the moving surface of the conveyor, so that as the first foam sheet with lifted leading edge separates from the second foam sheet as the second foam sheet continues to be transported by the moving surface of the conveyor;
a frame supporting the clamp above the conveyor; and
a clamp carriage configured for lowering the clamp to a first height above the moving surface of the conveyor and for raising the clamp to a second height above the moving surface of the conveyor.

2. The apparatus of claim 1, further comprising at least one mounting bracket to join the frame to supporting structure of the conveyor.

3. The apparatus of claim 1, further comprising at least one first pneumatic cylinder that is directly or indirectly linked to the clamp and configured to open the clamp and to close the clamp.

4. The apparatus of claim 1, further comprising at least one second pneumatic cylinder that is directly or indirectly linked to the clamp carriage and configured to raise and to lower the clamp carriage.

5. The apparatus of claim 1, wherein the moving surface of the conveyor travels under the frame to convey the foam sheet and the second foam sheet under the frame and to the clamp.

6. The apparatus of claim 5, wherein the moving surface of the conveyor conveys the second foam sheet away from the frame and away from the clamp.

7. The apparatus of claim 1, wherein the foam sheet has a first surface and a second surface opposite the first surface, and wherein the first surface remains in contact with the second foam sheet as the foam sheet is conveyed to the clamp.

8. The apparatus of claim 7, wherein as the clamp grips and lifts the leading edge of the foam sheet to the second height above the moving surface of the conveyor, a portion of the first surface of the foam sheet separates from the second foam sheet while a remaining portion of the foam sheet including the trailing edge remains frictionally engaged with the second foam sheet, and the second foam sheet remains frictionally engaged with the moving surface of the conveyor.

9. The apparatus of claim 8, wherein the first surface of the foam sheet is progressively turned upwardly away from the moving surface of the conveyor as the leading edge of the foam sheet is held at the second height above the moving surface of the conveyor.

10. The apparatus of claim 9, wherein the clamp is configured to release the leading edge of the foam sheet onto the moving surface of the conveyor after the trailing edge of the foam sheet has traveled under the frame, and wherein upon release from the clamp, the foam sheet is inverted so that the second surface contacts either the moving surface of the conveyor or the moving surface of a second conveyor, and wherein the first surface is directed upwardly.

11. The apparatus of claim 7, wherein at least the first surface of the foam sheet is profiled.

12. The apparatus of claim 1, wherein the clamp is configured to release the leading edge of the foam sheet so that the foam sheet is deposited onto the moving surface of the conveyor behind the second foam sheet, and inverted so that the surface of the foam sheet that was nested with the second foam sheet is directed upwardly.

13. The apparatus of claim 1, further comprising a second conveyor with a second moving surface, wherein the second conveyor is disposed at a height below the moving surface of the first conveyor.

14. The apparatus of claim 13, wherein the second conveyor transports a third foam sheet.

15. The apparatus of claim 14, wherein as the clamp grips and lifts the leading edge of the foam sheet to the second height above the moving surface of the conveyor, a portion of the first surface of the foam sheet separates from the the second foam sheet while a remaining portion of the foam sheet including the trailing edge remains frictionally engaged with the second foam sheet.

16. The apparatus of claim 15, wherein the first surface of the foam sheet is progressively turned upwardly away from the moving surface of the conveyor as the leading edge of the foam sheet is held at the second height above the moving surface of the conveyor.

17. The apparatus of claim 16, wherein the clamp is configured to release the leading edge of the foam sheet onto the moving surface of the conveyor after the trailing edge of the foam sheet has traveled under the frame, and after the third foam sheet has been conveyed by the second conveyor to a position beyond the clamp, and wherein upon release from the clamp, the foam sheet is inverted so that the second surface contacts either the moving surface of the conveyor or the second moving surface of the second conveyor, and the first surface of the foam sheet is directed upwardly.

18. The apparatus of claim 11, wherein the second foam sheet has a first surface and a surface opposite the first surface, and wherein at least the first surface of the second foam sheet is profiled.

19. A method for inverting position of a multi-layered foam sheet on a conveyor, comprising:

conveying the multi-layered foam sheet with the conveyor having a moving surface, said foam sheet comprising a top layer with a profiled surface and a bottom layer with a profiled surface, said top layer and said bottom layer nested together at their profiled surfaces, wherein the bottom layer has a second surface opposition the profiled surface that is in contact with the moving surface of the conveyor, and wherein the top layer has a second surface opposite the profiled surface of the top layer, said top layer further comprising a leading edge and a trailing edge;

gripping the leading edge of the top layer with a clamp;

lifting the clamp from a first height above the moving surface to a second height above the moving surface while allowing a remaining portion of the foam sheet to continue to be conveyed by the moving surface, so that the top layer progressively separates from the bottom layer as the bottom layer is conveyed by the moving surface; and after the trailing edge of the top layer has passed under the clamp and the leading edge of the top layer held by the clamp, releasing the leading edge, wherein after the leading edge is released, the top layer of the foam sheet is inverted so that the profiled surface is directed upwardly away from the moving surface of the conveyor and the second surface of the top layer is in contact with the moving surface of the conveyor.

20. The method of claim 19, wherein the second surface of the top layer is planar or substantially planar.

21. The method of claim 19, further comprising:

conveying a second foam sheet on a second moving surface of a second conveyor, wherein the second conveyor is positioned below the first conveyor.

22. The method of claim 21, wherein the leading edge of the top layer held by the clamp is released after the second foam sheet has been conveyed to a downstream position ahead of the top layer of the foam sheet.

23. The method of claim 19, wherein the clamp releases the leading edge of the top layer after the bottom layer has been conveyed to a location away from the clamp.

24. The method of claim 19, wherein the top layer progressively unnests from the bottom layer, and the top layer curls back or inverts to expose the profiled surface thereof.

25. The method of claim 19, wherein the multi-layered foam sheet is formed of a flexible polyurethane foam or a viscoelastic polyurethane foam or a gel-infused polyurethane foam.

26. The apparatus of claim 1, wherein the foam sheet is formed of a flexible polyurethane foam or a viscoelastic polyurethane foam or a gel-infused polyurethane foam.

27. The apparatus of claim 26, wherein the second foam sheet is formed of a flexible polyurethane foam or a viscoelastic polyurethane foam or a gel-infused polyurethane foam.

* * * * *